United States Patent
Mutikainen et al.

(10) Patent No.: US 9,967,132 B2
(45) Date of Patent: May 8, 2018

(54) CORRELATING COMMUNICATION SESSIONS

(75) Inventors: Jari Mutikainen, Lepsama (FI); Miikka Juhana Poikselka, Espoo (FI)

(73) Assignee: Nokia Solutions and Networks Oy, Espoo (FI)

(*) Notice: Subject to any disclaimer, the term of this patent is extended or adjusted under 35 U.S.C. 154(b) by 703 days.

(21) Appl. No.: 12/936,542

(22) PCT Filed: Apr. 7, 2009

(86) PCT No.: PCT/EP2009/054154
§ 371 (c)(1),
(2), (4) Date: Oct. 21, 2010

(87) PCT Pub. No.: WO2009/124938
PCT Pub. Date: Oct. 15, 2009

(65) Prior Publication Data
US 2011/0032906 A1    Feb. 10, 2011

(30) Foreign Application Priority Data

Apr. 8, 2008    (WO) ................. PCT/EP2008/054239

(51) Int. Cl.
*H04L 12/66* (2006.01)
*H04L 29/06* (2006.01)
(Continued)

(52) U.S. Cl.
CPC .... *H04L 29/12584* (2013.01); *H04L 61/2596* (2013.01); *H04L 61/3095* (2013.01);
(Continued)

(58) Field of Classification Search
CPC ..... H04W 76/021; H04W 8/20; H04W 36/00; H04L 12/66; H04L 29/12584;
(Continued)

(56) References Cited

U.S. PATENT DOCUMENTS 8,150,969 B2 * 4/2012 Van Elburg ....... H04L 29/12594
                                                      370/352
8,243,715 B2 * 8/2012 Itzkovitz et al. ............. 370/352
(Continued)

FOREIGN PATENT DOCUMENTS

CN    101232711 A  *  7/2008    ....... H04L 29/12188
EP    2091181 A1   *  8/2009    ....... H04L 29/12188
(Continued)

OTHER PUBLICATIONS

3rd Generation Partnership Project; Technical Specification Group Services and System Aspects; "IP Multimedia Subsystem (IMS)"; Stage 2 (Release 8) 3GPP TS 23.228 V8.4.0 (Mar. 2008), Sophia Antipolis, France.
(Continued)

*Primary Examiner* — Parth Patel
*Assistant Examiner* — Kai Chang
(74) *Attorney, Agent, or Firm* — Harrington & Smith (57) ABSTRACT

The present invention relates to a session handling entity in a communication system, the session handling entity (S-CSCF) maintain a relationship between at least one public user identity, at least one private user identity and at least one contact address of a user of a communication system. Then receives from a subscription entity an indication of a correlation identity associated with the user, and stores the indication of the correlation identity as part of the relationship maintained by the maintaining means. When a session request of the user is received, determining the correlation identity for the user based on a contact address of the user included in the session request and the indication of a correlation identity associated with the user take place, and the correlation identity is included in the session request.

14 Claims, 8 Drawing Sheets

(51) Int. Cl.
*H04L 29/12* (2006.01)
*H04W 36/00* (2009.01)
*H04W 76/02* (2009.01)
*H04W 8/20* (2009.01)

(52) U.S. Cl.
CPC ........... *H04W 76/021* (2013.01); *H04L 12/66* (2013.01); *H04L 65/1016* (2013.01); *H04L 65/1046* (2013.01); *H04L 65/1073* (2013.01); *H04W 8/20* (2013.01); *H04W 36/00* (2013.01)

(58) Field of Classification Search
CPC ............. H04L 65/1016; H04L 65/1046; H04L 65/1073; H04L 61/2596; H04L 61/3095
USPC .................................................. 370/352–356
See application file for complete search history.

(56) References Cited

U.S. PATENT DOCUMENTS

| | | | | |
|---|---|---|---|---|
| 9,001,730 | B2* | 4/2015 | Noldus | H04W 60/005 370/328 |
| 2004/0059781 | A1* | 3/2004 | Yoakum | H04L 29/06 709/204 |
| 2004/0196796 | A1* | 10/2004 | Bajko et al. | 370/310 |
| 2004/0230697 | A1* | 11/2004 | Kiss et al. | 709/245 |
| 2005/0009520 | A1* | 1/2005 | Herrero et al. | 455/435.1 |
| 2006/0178132 | A1* | 8/2006 | Tammi et al. | 455/411 |
| 2006/0218291 | A1* | 9/2006 | Zhu et al. | 709/229 |
| 2006/0229078 | A1* | 10/2006 | Itzkovitz et al. | 455/445 |
| 2007/0127495 | A1* | 6/2007 | de Gregorio et al. | 370/395.52 |
| 2007/0195805 | A1* | 8/2007 | Lindgren | H04L 65/1016 370/401 |
| 2007/0237159 | A1* | 10/2007 | Yamada et al. | 370/395.53 |
| 2007/0274289 | A1* | 11/2007 | Buckley et al. | 370/351 |
| 2008/0003957 | A1* | 1/2008 | Schwagmann | H04L 61/2061 455/91 |
| 2008/0062966 | A1* | 3/2008 | den Hartog et al. | 370/352 |
| 2008/0064369 | A1* | 3/2008 | Xie et al. | 455/411 |
| 2008/0070543 | A1* | 3/2008 | Matuszewski | H04L 63/126 455/404.1 |
| 2008/0123625 | A1* | 5/2008 | Buckley | H04M 7/123 370/352 |
| 2008/0176538 | A1* | 7/2008 | Terrill | H04L 67/306 455/414.1 |
| 2009/0016324 | A1* | 1/2009 | Prouvost | H04L 12/66 370/352 |
| 2009/0106437 | A1* | 4/2009 | Mostafa | H04L 29/12594 709/230 |
| 2009/0129318 | A1* | 5/2009 | Xu | H04Q 3/0045 370/328 |
| 2009/0253431 | A1* | 10/2009 | Shi | H04L 29/12188 455/435.1 |
| 2009/0323636 | A1* | 12/2009 | Dillon et al. | 370/331 |
| 2010/0046501 | A1* | 2/2010 | Witzel et al. | 370/352 |
| 2010/0067456 | A1* | 3/2010 | Xu | H04W 36/0022 370/329 |
| 2010/0199330 | A1* | 8/2010 | Schott et al. | 726/4 |
| 2010/0246523 | A1* | 9/2010 | Astrom | H04L 65/1016 370/329 |
| 2011/0044327 | A1* | 2/2011 | Mahdi et al. | 370/352 |
| 2011/0238845 | A1* | 9/2011 | Keller et al. | 709/227 |
| 2011/0270995 | A1* | 11/2011 | Mutikainen et al. | 709/227 |

FOREIGN PATENT DOCUMENTS

| | | |
|---|---|---|
| WO | WO 03/005669 A1 | 1/2003 |
| WO | WO 2006/082528 A2 | 8/2006 |
| WO | WO 2008/076015 A1 | 6/2008 |

OTHER PUBLICATIONS

3rd Generation Partnership Project; Technical Specification Group Services and System Aspects; "Voice Call Continuity (VCC) between Circuit Switched (CS) and IP Multimedia Subsystem (IMS)"; Stage 2 (Release 7) 3GPP TS 23.206 V7.5.0 (Dec. 2007), Sophia Antipolis, France.

3rd Generation Partnership Project; Technical Specification Group Services and System Aspects; "Single Radio Voice Call Continuity (SRVCC)"; Stage 2 (Release 8) 3GPP TS 23.216 V1.0.0 (Mar. 2008), Sophia Antipolis, France.

3rd Generation Partnership Project; Technical Specification Group Core Network and Terminals; "IP multimedia call control protocol based on Session Initiation Protocol (SIP) and Session Description Protocol (SDP)"; Stage 3 (Release 8) 3GPP TS 24.229 V8.3.0 (Mar. 2008), Sophia Antipolis, France.

3rd Generation Partnership Project; Technical Specification Group Core Network and Terminals; "Voice Call Continuity between the Circuit-Switched (CS) domain and the IP Multimedia Core Network (CN) (IMS) subsystem"; Stage 3 (Release 7) 3GPP TS 24.206 V7.4.0 (Dec. 2007), Sophia Antipolis, France.

3rd Generation Partnership Project; Technical Specification Group Services and Architecture; "IP Multimedia Subsystem (IMS) Service Continuity"; Stage 2 (Release 8) 3GPP TS 23.237 V0.1.0 (Mar. 2008), Sophia Antipolis, France.

3GPP TSG SA WG2 Architecture—VCC Ad-hoc: "Use case support for V3 interface—2nd solution", Aug. 23-25, 2006, Sophia Antipolis, France.

* cited by examiner

CORRELATING COMMUNICATION SESSIONS

TECHNICAL FIELD OF THE INVENTION

The invention relates to a session handling entity, subscription entity, a method and computer program products for correlating communication sessions.

BACKGROUND OF THE INVENTION

Within the IP (Internet Protocol) Multimedia Subsystem (IMS) as defined by $3^{rd}$ Generation Partnership Project (3GPP) Session Initiation Protocol (SIP) defined by Internet Engineering Task Force (IETF) is used for controlling communication. SIP is an application-layer control protocol for creating, modifying, and terminating sessions with one or more participants. These sessions may include Internet multimedia conferences, Internet telephone calls, and multimedia distribution. Members in a session can communicate via multicast or via a mesh of unicast relations, or a combination of these.

Figure 1:
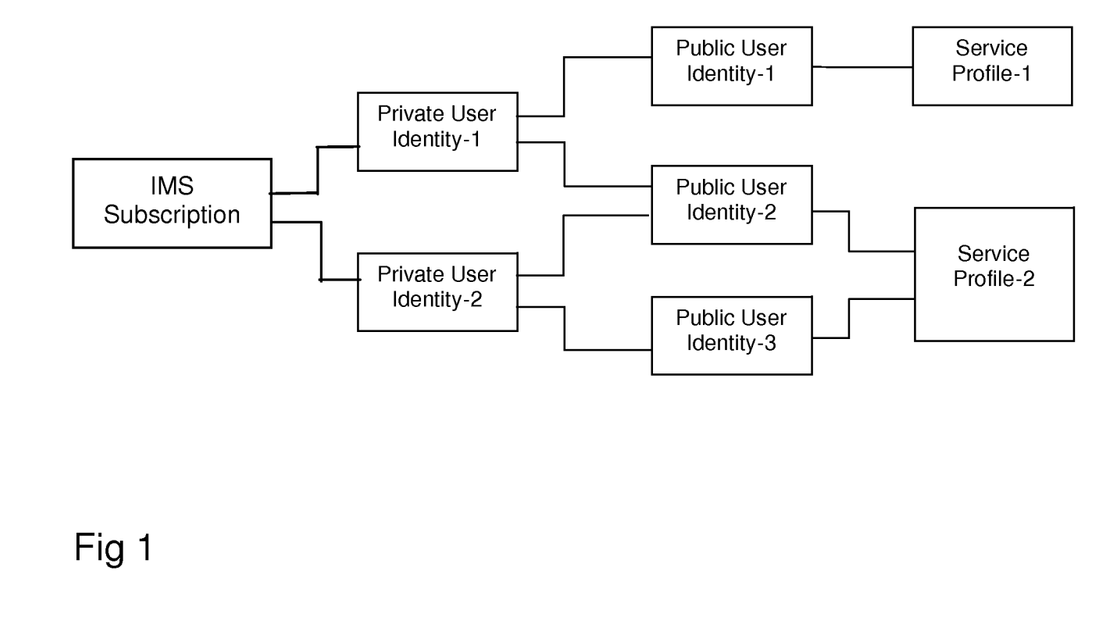
FIG. 1 illustrates shared IMS identities

The standardized IMS includes number of features that have relationships with each other. One of features is capability to share the same user identity in multiple devices as shown in this FIG. 1. For example, a user can have two or more devices that share the same identity for example the same IMS public user identity (IMPU), like public user identity 2 in FIG. 1. The shared identity can be used to initiate communication with any of these devices. Similarly a user can receive communication targeted to this identity with any of the devices bound to this identity. Identity concept could be extended also to cover use case where two or more different users, for example two family members, are sharing the same identity.

Voice call continuity (VCC) as defined by the 3GPP defines a capability to offer mobile voice services for a multi-radio terminal user via both circuit switched (CS) and packet switched (PS)/IMS access as preferred. The feature also contains capability to transfer ongoing call from one access to another e.g. from wireless local are network (WLAN) to CS access.

Single Radio VCC (SR-VCC) enables to perform handover from long term evolution (LTE) radio access network to CS access network. A network function is acting as a gateway between UE and an application server (AS) providing voice call continuity feature. The network function which can also be called as interworking function (IWF) can initiate a handover request towards the application server (AS) providing the voice call continuity based on received information from a radio access network, such as LTE, and from an evolved packet core system.

Multimedia session continuity enables continuity of PS media streams when PS access is changed, for example, by transferring a video session from WLAN to Universal Mobile Telecommunications System (UMTS) terrestrial radio access network (UTRAN) using IMS and application layer mechanisms. IMS centralized services (ICS) provide service execution in the IMS even though a device can use CS network to make calls. All services are executed in the IMS and all originated and terminated CS calls are forcedly routed to the IMS for service execution. To manage mid-call services ICS UE must use SIP signalling to initiate service execution. This control channel is called as I1-PS in ongoing standardization.

Figure 2:
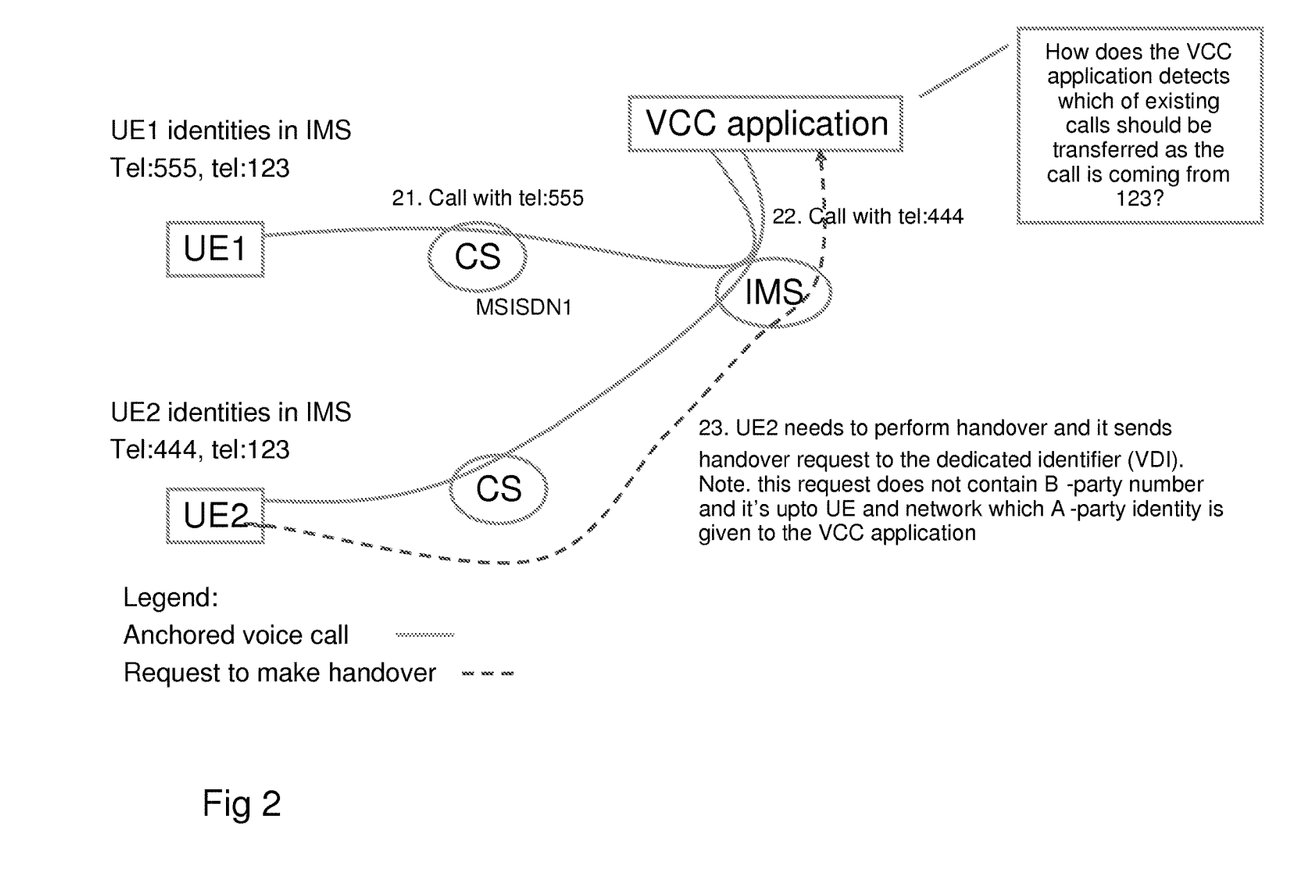
FIGS. 2-5 presents IMS scenarios relevant for the invention.
Figure 3:
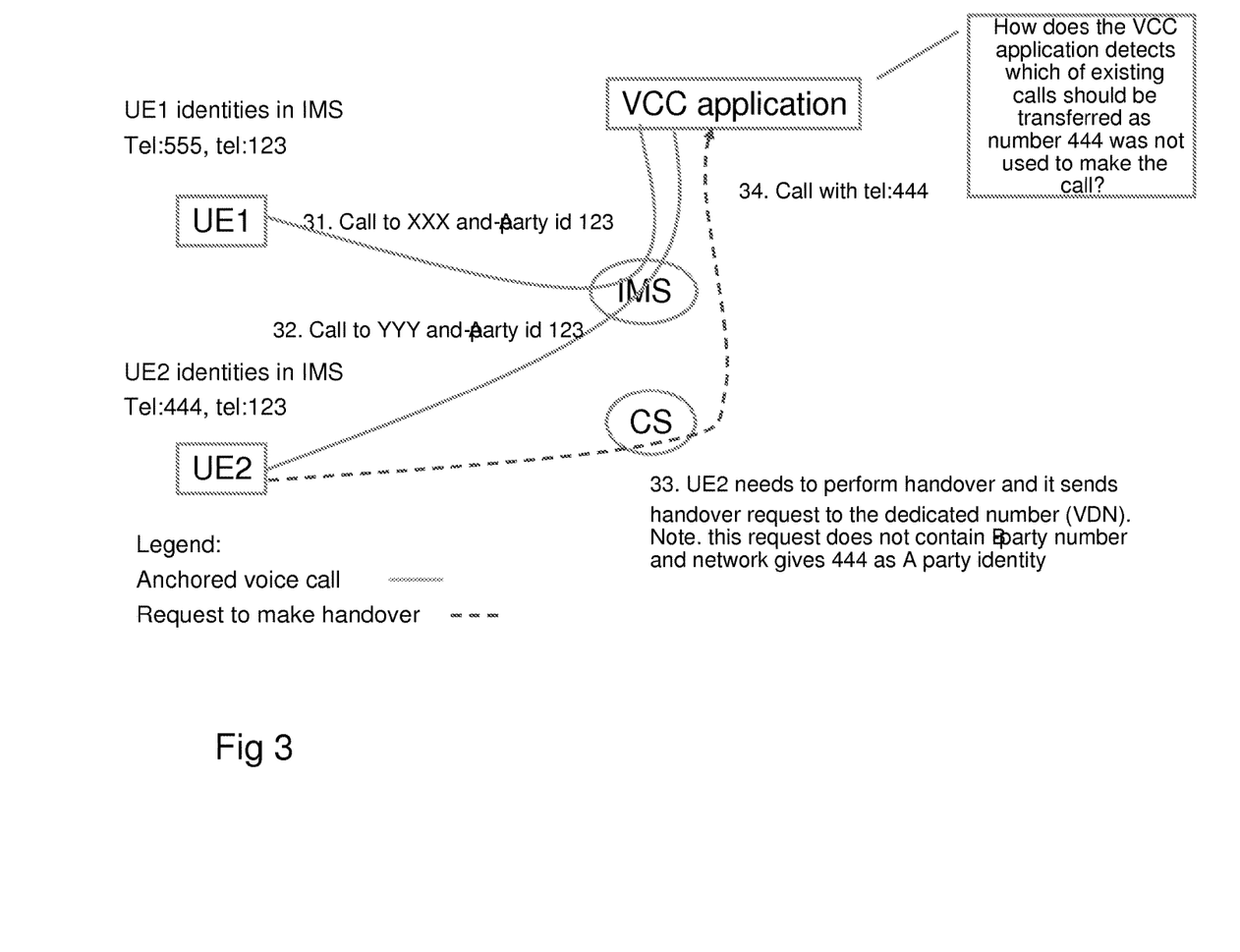

In FIG. 2, when two devices UE-1 and UE-2 share an identity, for example, "tel:123" and both devices are VCC capable and both have ongoing CS voice call which the network has anchored at the VCC application, it can happen that the UE-2 detects WLAN coverage and decides to perform a handover to WLAN. The UE-2 sends an INVITE request of SIP to a VCC Domain Transfer URI (VDI) and the request gets routed to the VCC application. The VDI is a SIP URI used by the UE to request a Domain Transfer Function (DTF) to perform a domain transfer to the IMS from the CS domain. However it is up to UE configuration which public identity the UE-2 set as a P-Preferred-Identity in the SIP request, and it may use an identity which is shared with UE-1, "tel:123". Similarly if the identity is missing then the network can insert the default identity as A-party identity which can be "tel:123". In either case, the VCC application is not able to differentiate between the CS bearers of the UE-1 and UE-2 to select which CS bearer is effected by the handover. In FIG. 3, similar problem can exist the other way as well when users have made calls via the IMS and then the UE-2 realizes that coverage is dropping and it must make a handover to CS. If the IMS originated calls are made with shared identity the VCC application is not able to see which IMS session should be effected.

Figure 4:
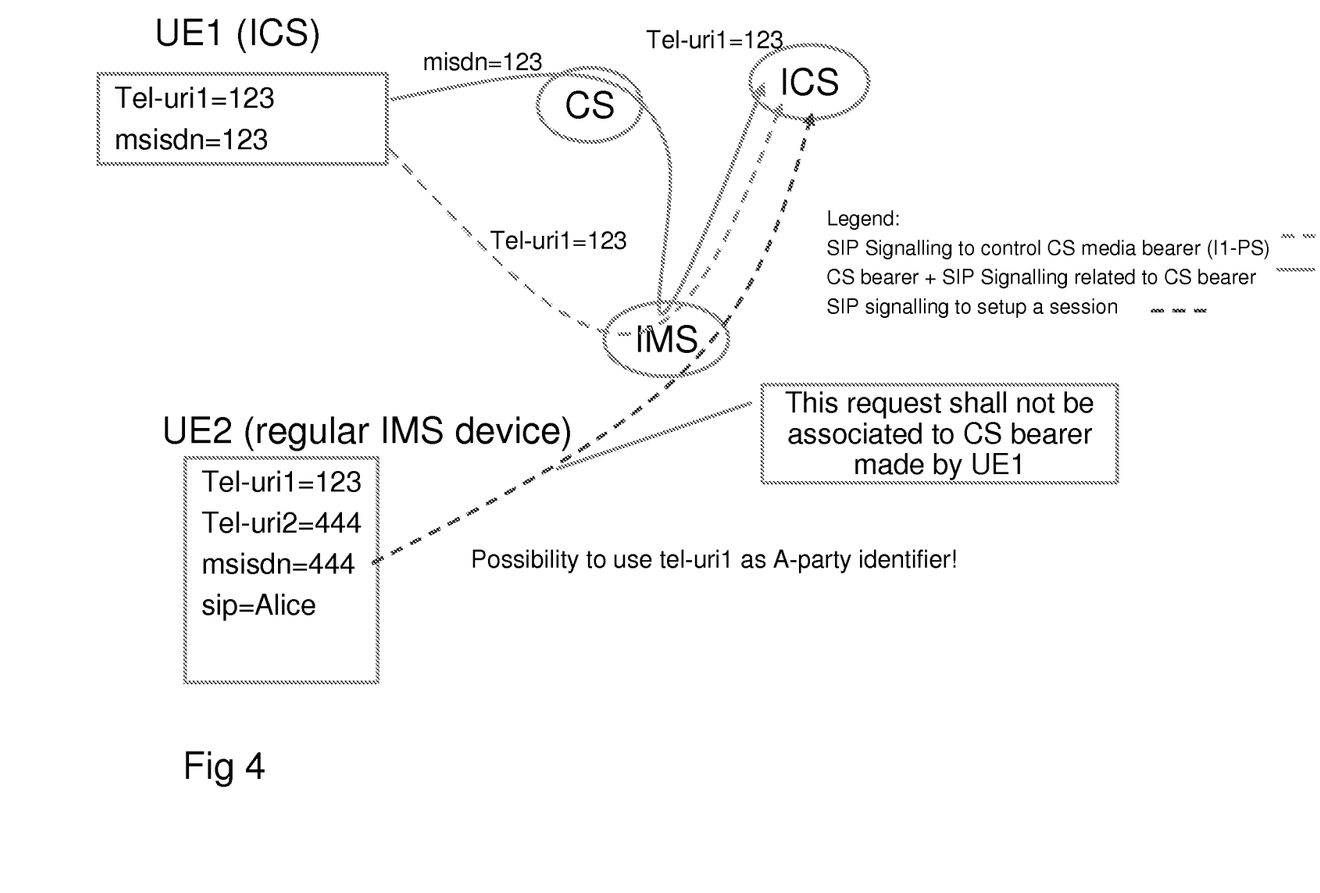
Figure 5:
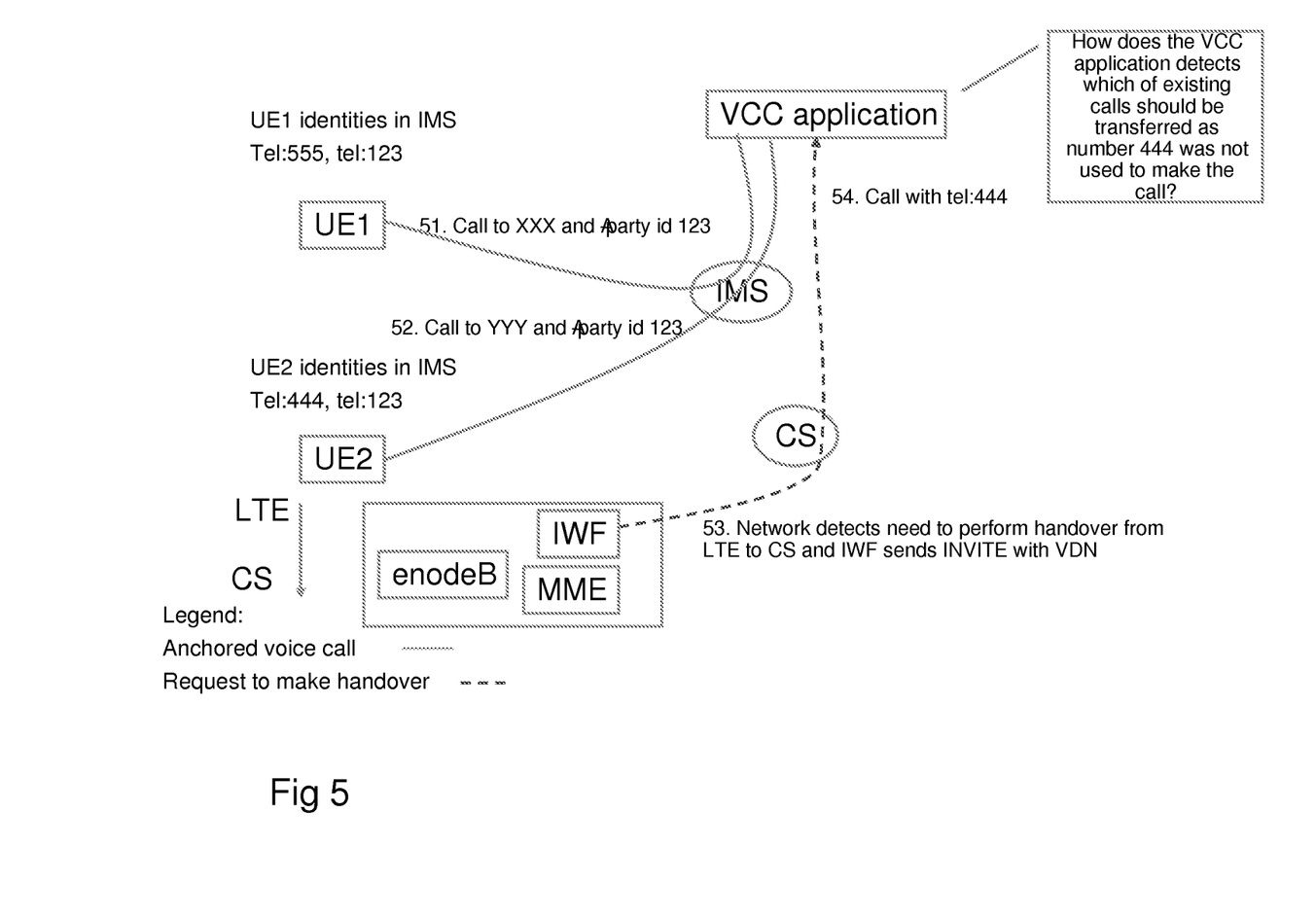

In FIG. 4, with the IMS centralized services (ICS), for example, UE-1 has made a call via a CS access and can use I1-PS whenever needed. However, it is possible that UE-2 may make a call with the shared identity and the ICS AS must not associate this signalling with bearer signalling that UE1 is using. In ICS, the problem is more challenging if the dynamic I1-ps is used; there the UE-1 and UE-2 both may have an ongoing CS call (using the same identity in P-Asserted-Identity), and when either UE adds a I1-ps control channel using SIP, the AS must be able to determine to which CS call this SIP session is related. In FIG. 5, similar problem exist in SR-VCC. Starting point is the same as in above examples but in the SR-VCC, an IWF receives a request to start a handover and it generates a CS call towards a VCC Domain Transfer Number (VDN) and uses an identity available in CS side. The VDN is a public telecommunication number, used by the UE to request the DTF to perform a domain transfer to the CS domain from the IMS.

The object of the invention is to overcome the above problems.

SUMMARY OF THE INVENTION

The present invention overcomes the above problem by providing session handling entity, a method and a computer program, comprising maintaining a relationship between at least one public user identity, at least one private user identity and at least one contact address of a user of a communication system, receiving from a subscription entity an indication of a correlation identity associated with the user, storing the indication of the correlation identity as part of the relationship maintained, receiving a session request of the user, determining the correlation identity for the user based on a contact address of the user included in the session request and the indication of a correlation identity associated with the user, and including the correlation identity in the session request.

The session handling entity, the method and the computer program can further comprise transmitting the session request to an application server. The determining can comprise determining the correlation identity by mapping a combination of the contact address and the public identity received in the session request to the private identity of the user. The session request can be according to session initiation protocol, SIP.

The indication of the correlation identity associated with the user can comprise the correlation identity being bound to the private identity of the user. The session request can comprise one of a request to transfer the session to another access network technology, a handover request and an emergency session request. The maintaining can comprise maintaining the relationship between the at least one public user identity, the at least one private user identity and the at least one contact address within a subscription of the user. The indication of the correlation identity can be received from a home subscriber server (HSS) using diameter protocol.

The session handling entity can be a call state control function of an internet protocol multimedia subsystem. The correlation identity can be included in a SIP header of the request.

Also an application server and method is provided comprising maintaining subscription data of a user, assigning one of identities in the subscription data as a correlation identity for the user, and sending an indication of the correlation identity to a session handling entity. The indication of the correlation identity can be sent as part of a user profile download. The subscription entity can be a home subscriber server (HSS) of an internet protocol multimedia subsystem.

Also an application server is provided, comprising receiving a session request from the session handling entity, and identifying a session leg to be transferred to another access technology based on the correlation identity received in the session request.

The present invention has the advantage that an application server can correlate a CS bearer to a corresponding SIP session, and decide which call/session leg is to be affected by a request.

DETAILED DESCRIPTION OF THE INVENTION

Different type of network entities and functions exist in the IMS network. Call Session Control Functions (CSCF) implement a session control function in SIP layer. The CSCF can act as Proxy CSCF (P-CSCF), Serving CSCF (S-CSCF) or Interrogating CSCF (I-CSCF). The P-CSCF is the first contact point for the User Equipment (UE) within the IMS; the S-CSCF actually handles the session states in the network; the I-CSCF is mainly the contact point within an operator's network for all IMS connections destined to a subscriber of that network operator, or a roaming subscriber currently located within that network operator's service area.

The functions performed by the I-CSCF are, for example, assigning an S-CSCF to a user performing SIP registration and routing SIP requests received from another network towards the S-CSCF. The S-CSCF performs the session control services for the UE. It maintains a session state as needed by the network operator for support of the services and may be acting as Registrar, i.e. it accepts registration requests and makes its information available through the location server (e.g. HSS). The S-CSCF is the central point to users that are hosted by this S-CSCF. The S-CSCF provides services to registered and unregistered users when it is assigned to these users. This assignment is stored in the Home Subscriber Server (HSS).

The HSS is the master database for a given user. It is the entity containing the subscription-related information to support the network entities actually handling calls/sessions. As an example, the HSS provides support to the call control servers (CSCFs) in order to complete the routing/roaming procedures by solving authentication, authorisation, naming/addressing resolution, location dependencies, etc.

The HSS is responsible for holding the following user related information:
User Identification, Numbering and addressing information
User Security information: Network access control information for authentication and authorization, such as password information
User Location information at inter-system level: the HSS supports the user registration, and stores inter-system location information, etc.
User profile information.

Cx reference point or Cx interface is an interface between a CSCF and a HSS, supporting the transfer of data between them. The Cx reference point is based on the diameter protocol with 3GPP standard diameter applications. Sh interface is a corresponding interface between the HSS and an AS. Diameter is an authentication, authorisation, and accounting (AAA) protocol defined by the IETF and used for network access services, such as dial-up and mobile IP.

An Application Server (AS) is offering value added IP multimedia (IM) services to users of the IMS network and resides either in the IMS user's home network or in a third party location. The third party could be a network or simply a stand-alone AS. The AS may host and execute various services and can influence and impact a SIP session on behalf of the services. The IP multimedia Subsystem Service Control Interface (ISC) interface is between the S-CSCF and the service platforms (i.e. Ass). The ISC interface offers extended services to subscribers. ASs that are connected to the IMS are controlled via ISC interface. The protocol used on the ISC interface is the SIP.

A media gateway control function (MGCF) acts as an interworking point between a circuit switched (CS) network and an IP network in the control plane of the network. The MGCF controls the parts of the call state related to connection control for media channels in a media gateway (MGW), communicates with call state control, and performs protocol conversion between the call control protocols, such as SIP and ISUP.

IP Multimedia (IM) private user identity (IMPI) is a user identity that is assigned by the home network operator and used, for example, for registration, authorisation, administration, and accounting purposes. The private user identity is stored in the IM services identity module (ISIM). For the UMTS subscriber identity module (USIM), the private user identity is derived from the international mobile subscriber identity (IMSI). The private user identity takes the form of a network access identifier (NAI). The private user identity identifies the user for the IMS and it is stored in the Home Subscriber Server (HSS)

IM public user identity (IMPU) is a user identity that is used by any user for requesting communications with other users. The public user identity takes the form of a SIP uniform resource identifier (URI) or E.164 number in form of TEL URI. Every IMS subscriber has one or more public user identities. At least one public user identity is stored in the IM services identity module (ISIM). The user equipment can receive more public identities from the IMS, where they are stored in the HSS. For a user with a UMTS subscriber identity module (USIM), a temporary public user identity is derived from the international mobile subscriber identity (IMSI). In some cases, the value will be the same as that of the private user identity.

Contact and contact address refer to Contact header of SIP. Contact provides a SIP URI that can be used to contact that specific instance of the UE for subsequent requests. The scope of the Contact can be global. That is, the Contact header field value contains a URI at which the UE would like to receive requests, and this URI is valid even if used in subsequent requests outside of any dialogs. A Contact header field value can contain a display name, a URI with URI parameters, and header parameters.

TEL URI is a uniform resource identifier (URI) address which identifies a connection to a terminal that handles normal voice telephone calls, a voice mailbox or other voice messaging system.

The IMS contains means to indicate and distribute so called default IMS public user identifier. From UE point of view, a SIP 200 OK of REGISTER request can contain the default public user identity as the first uniform resource identifier (URI) on the list of URIs present in P-Associated-URI header of SIP protocol. A P-CSCF behavior can store the default public user identity, including its associated display name, if provided, for use with procedures for the P-Asserted-Identity header. The default public user identity can be the first on the list of URIs present in the P-Associated-URI header. The first URI on the list of public user identities supplied by a HSS to a S-CSCF can indicate the default public user identity to be used by the S-CSCF. The S-CSCF is requested to include this in the P-Associated-URI header when sending 200 OK of REGISTER request. When a session is established a P-CSCF can set a network asserted identity in a P-Asserted-Identity header of SIP to outgoing request based on the preference indicated by the UE (P-Preferred-Identity) or based on the default IMS public user identifier in case the UE did indicate the preferred identity.

In a CSI solution a random number is carried in a CS user-to-user signaling (UUS) and in SIP, which random number correlates the CS and SIP together. This requires a support of the UUS in the UE and in the CS network; however, the UUS is not very widely supported.

An allocation of a dynamic VDN for each UE at the time of SIP registration or immediately after the registration can also be done. This can lead to reserving huge amount of telephone numbers (E.164 addresses), one E.164 statically allocated for each registered UE. This does not provide a solution in CS to PS direction, i.e. when the VDI must be allocated at the time of CS call establishment.

IMS centralized service or Multimedia session continuity (MMSC) work does not have solution to overcome this matter. Available alternatives are a subscriber or a device specific VDN/VDI, dynamic VDN/VDI (created on call basis), a.k.a. session transfer identification (STI), a dynamic Public Service Identity (PSI) communicated with a static I1-PS signaling. Again the same problem as above regarding in regard to number of E.164 addresses. In addition, this solution requires that every CS call is accompanied with the corresponding SIP signalling which carries the dynamic E.164.

Another solution is to mandate a tel-URI which equals with the used identifier in CS domain (mobile subscriber international integrated services digital network (ISDN) number (MSISDN)) to be an IMS default user identity or by mandating the UE to take care of using equivalent identities when it is engaged simultaneously in CS and IMS. This can limit a lot the IMS identity flexibility. In practice it would mean that any UE which is able to make CS calls and IMS sessions shall not use any other identity than the MSISDN in any SIP session it initiates. Also, mandating the UE to use the equivalent identities would require that the UE is aware of its identity in the CS domain (MSISDN), and typically this is not the case.

In an embodiment of the invention, an S-CSCF functionality is enhanced to detect which public user identity can be used to correlate different SIP dialogs in the AS and to deliver this identifier to the AS. In one aspect of the invention a subscription data/user profile in extended and Cx and Sh reference points can convey default tel-uri and/or CS correlation tel-uri to the S-CSCF and AS in addition to existing 'default-URI'. The CS correlation URI is a tel URI which contains the MSISDN of this UE (MSISDN of the IMSI of the UICC of the IMPI).

In one aspect of the invention, a new header is used to transport the above information from an S-CSCF to an AS, or an existing header is extended to carry the information. In one aspect, a registration event-package of SIP is extended to transport a correlation identity such as a default tel-uri. In one aspect of the invention, the correlation identity (correlation URI) can be carried in a P-Asserted-Identity header of SIP as an additional identity.

An embodiment of the invention is here described using a non-limiting example. Two UEs, UE-1 and UE-2 are sharing the same public user identity in the IMS and both UEs are engaged on communication. One of the UEs detects a need to perform a handover from one access to another access during the session.

For example, the UE-1 has the following identities
MSISDN1=111; used in CS domain
tel:111; personal identifier in the IMS
tel:555; shared identifier in the IMS
sip:mom@example.com; personal identifier in the IMS (default identity for this user)
sip:family@example.com; shared identifier in the IMS
IMPT1=user1@example.com
Contact address bound to IMS registration (IMPI1): a.b.c.d
Similarly, the UE2 can have the following identities
MSISDN2=222; used in CS domain
tel:222; personal identifier in the IMS (default identity for this user)
tel:555; shared identifier in the IMS
sip:dad@example.com; personal identifier in the IMS
sip:family@example.com; shared identifier in the IMS
IMPI2=user2@example.com
Contact address bound to IMS registration (IMPI2): 1.2.3.4
A VDI is an identifier to initiate a session transfer from CS to WLAN (IMS), for example handoverAS@example.com.

Figure 6:
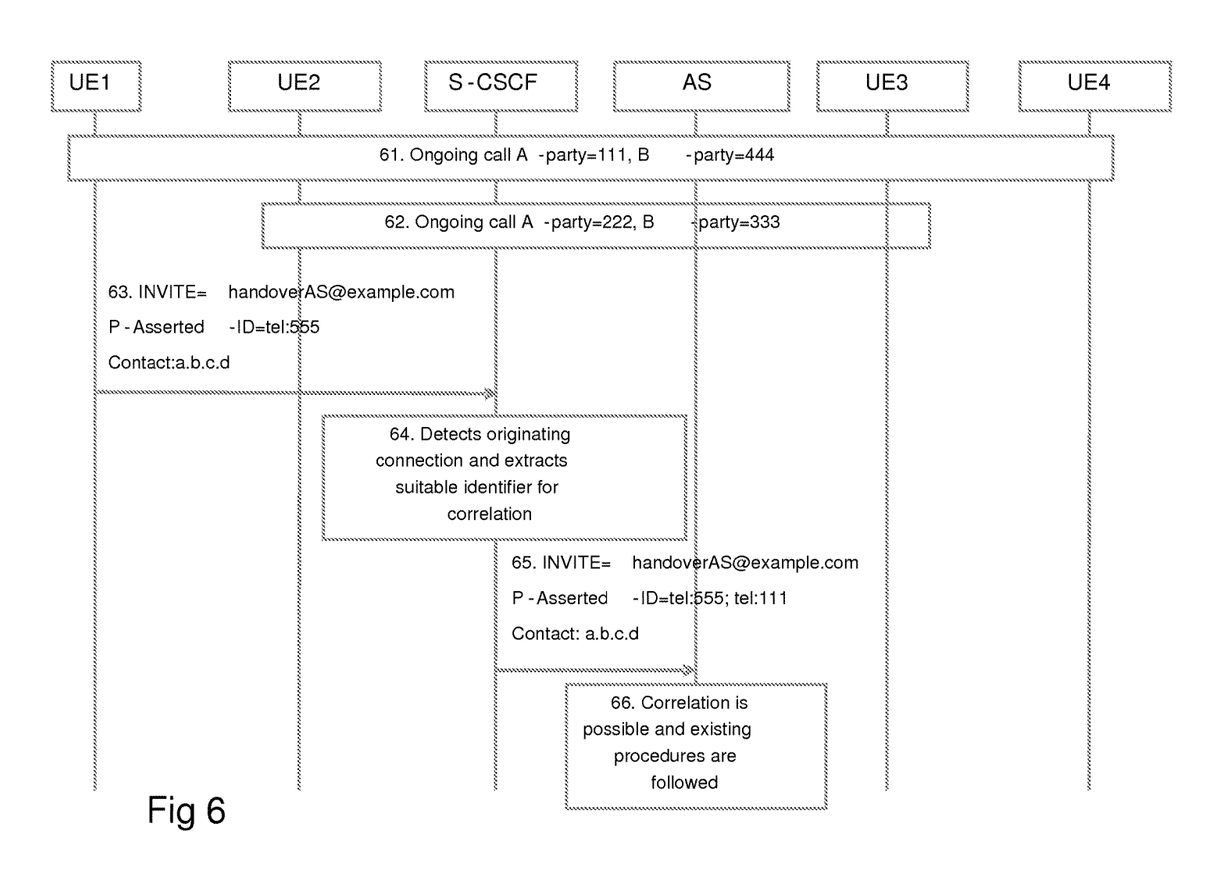
FIG. 6 illustrates a signaling flow according an embodiment of the invention.
Figure 7:
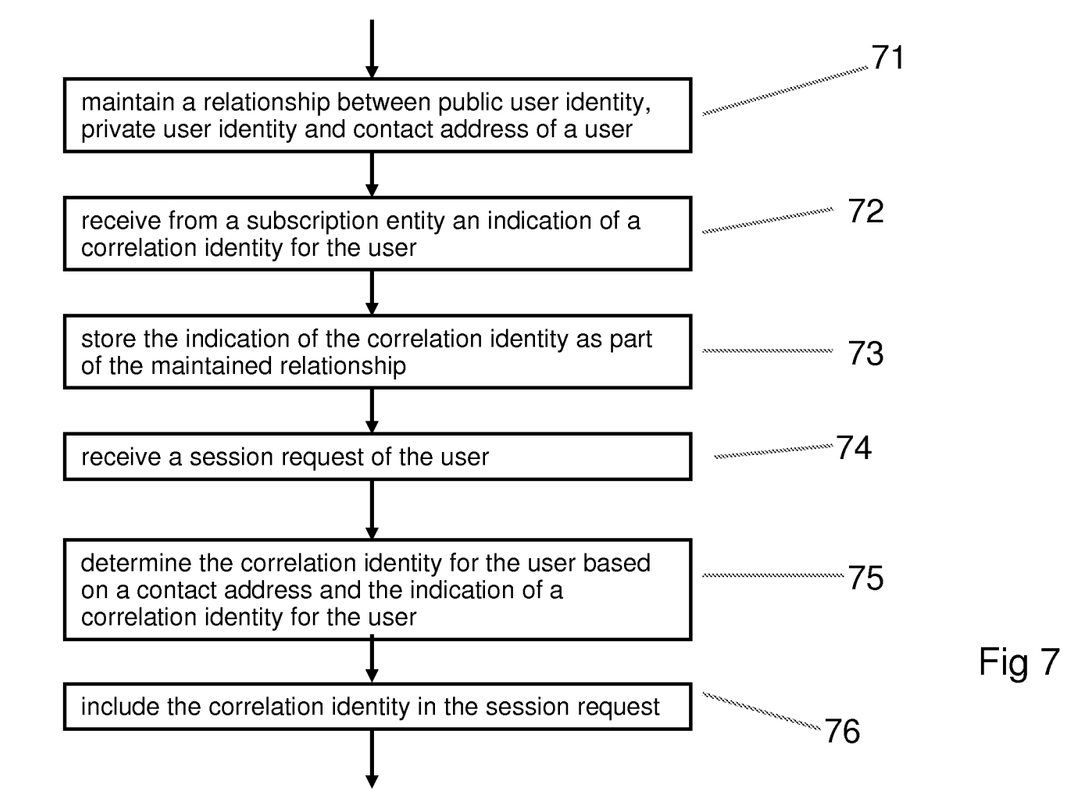
FIG. 7 illustrates process steps according an embodiment of the invention.

Reference is made to FIG. 6 to explain an embodiment of the invention. The UE1 and the UE2 can have active calls via the CS domain and the calls can be anchored to the AS, as illustrated with reference signs 61 and 62. Both devices can also be registered to the IMS, the UE1 can use the contact "a.b.c.d" and the UE2 can use the contact "1.2.3.4" when registering to IMS. Stored configuration information at the S-CSCF at the IMS registration phase can be:

| Identity | Contacts/IMPI |
|---|---|
| tel:111 | a.b.c.d;<br>user1@example.com |
| tel:222; default identity for user 2 | 1.2.3.4;<br>user2@example.com |
| tel:555; | a.b.c.d;<br>user1@example.com<br>1.2.3.4;<br>user2@example.com |
| sip:mom@example.com default identity for user 1<br>sip:dad@example.com | a.b.c.d;<br>user1@example.com<br>1.2.3.4;<br>user2@example.com |
| sip:family@example.com | a.b.c.d;<br>user1@example.com<br>1.2.3.4;<br>user2@example.com |

In signal 63, the UE-1 can initiate a session transfer and send an INVITE request to R-URI=handoverAS@example.com (VDI) and the UE-1 may add any of the registered public user identity in the P-Preferred-Identity field of the SIP. For example, the UE1 can prefer the identity "tel:555" and this can be asserted by the P-CSCF. Then, the S-CSCF can receive this request. According to one embodiment of the invention, the S-CSCF can determine the contact address of UE1 in the INVITE method, and based on the contact address it can detect that the request is using a certain IMPI (here IMPI1) and thus the request is coming from the UE1 (user1). As shown with sign 64, according to the invention, the S-CSCF has obtained a correlation identity, such as the default tel-uri and/or the correlation tel-uri information from the HSS as part of the user profile downloading at registration phase, and the S-CSCF can have following view of identities.

| Identity | Contacts/IMPI |
|---|---|
| tel:111; default tel-uri identity for user 1 | a.b.c.d;<br>user1@example.com |
| tel:222; default identity and/or CS correlation tel-uri for user 2 | 1.2.3.4;<br>user2@example.com |
| tel:555; | a.b.c.d;<br>user1@example.com<br>1.2.3.4;<br>user2@example.com |
| Sip:mom@example.com default identity for user 1<br>Sip:dad@example.com | a.b.c.d;<br>user1@example.com<br>1.2.3.4;<br>user2@example.com |
| Sip:family@example.com | a.b.c.d;<br>user1@example.com<br>1.2.3.4;<br>user2@example.com |

According to the invention, based on this information the S-CSCF can learn that the identity that an application server needs for the UE1 (IMPI1) is actually "111" and it can modify the INVITE request 65 accordingly and can send the modified request to the AS. In phase 66, the presence of "tel:111" (MSISDN of UE1) in the INVITE can enable the AS to correlate the INVITE request to the correct SIP session (CS call) which the AS has previously anchored, in order to perform the domain transfer correctly.

The table and figure shows only one possible use case but similar ones can be generated from other VCC use cases, MMSC, SR-VCC, ICS. In addition it should be noted that different encoding to differentiate the correlation tel-URI exists. Here the 'correlation identity' was added as an additional entry to the P-Asserted-Identity header, however it could be carried in other headers as well e.g. P-Served-User or a new header defined for this purpose.

Embodiments of the invention can solve the problem how CS calls and SIP sessions can be correlated to each other in the S-CSCF and the AS. The AS can get the MSISDN of the CS call in order to correlate the CS call and the SIP session. Mechanisms how the MSISDN can be carried to the IMS AS for CS originated calls are for example:

Non-transparent ISDN User Part (ISUP) links

MGCF maps the CS Called Line Identity (CLI) (MSISDN) to P-Asserted-Identity

Customised Applications for Mobile network Enhanced Logic (CAMEL) carries the MSISDN to the GSM service Control Function (gsmSCF) which can be implemented in the AS.

Above solutions can be provided to authenticate the CS user in the IMS. Without the MSISDN the IMS may not be able to authenticate the CS user, and the request cannot be proceed.

In one aspect of the invention the solution described in this invention can be applied to IMS emergency sessions. A public safety answering point (PSAP) is a network element for emergency services that is responsible for answering emergency calls. The PSAP can be able to call back to that particular UE which initiated an emergency session earlier to this PSAP. This procedure is called as emergency call back feature. According to this aspect of the invention, an S-CSCF adds a correlation identity, such as a CS correlation URI to the INVITE. The CS correlation URI carries the MSISDN of the UE. Since it is not possible to share the correlation URI within multiple devices, when the PSAP which is residing in the CS network calls back using this URI, the S-CSCF can find the distinct contact(s) which reach back to this particular UE.

Whether the S-CSCF needs to prevent forking in the emergency call back depends on the structure of the Implicit Registration Sets (IRS). If the shared public identities (sip: family@example.com and tel:555) and personal identities are not in the same IRS, then the S-CSCF may not fork when it receives an incoming requires to the correlation tel uri. Otherwise, the S-CSCF can prevent the forking based on the emergency call back indicator in the incoming request.

In the above procedure emergency sessions can be routed to the S-CSCF, so that the S-CSCF can implement the procedures described in this invention. If the emergency sessions can be routed as regular sessions, i.e. from an P-CSCF to the S-CSCF, the invention can be applied. If however the P-CSCF routes the emergency session to Emergency CSCF (E-CSCF), then the E-CSCF can implement above described procedures.

An operator may define a correlation identity, for example a correlation (tel) URI, for users as part of their subscription data. This information can be permanently stored in the HSS and can be downloaded to an S-CSCF when a user registers to the IMS. As part of originating service control procedures, the S-CSCF can use the downloaded information to execute proper service control. When the correlation identity is assigned for the users, the S-CSCF may add this identifier to the request which is sent for application server(s) providing additional service execution.

A user may have multiple public user identities and even multiple implicit registration sets. In order to ensure correct behaviour in all possible cases, the operator can ensure that correlation identity is present in all required implicit registration sets that contains public user identity (identities) that are subject for session correlation at the application server(s). This can be realized so that a correlation identity is assigned to all implicit registration sets. If the correlation identity is not intended for communication in all implicit sets it can be marked as barred public user identity in those sets that do not use correlation identity for ordinary communication but it is used only for correlation purposes.

Figure 8:
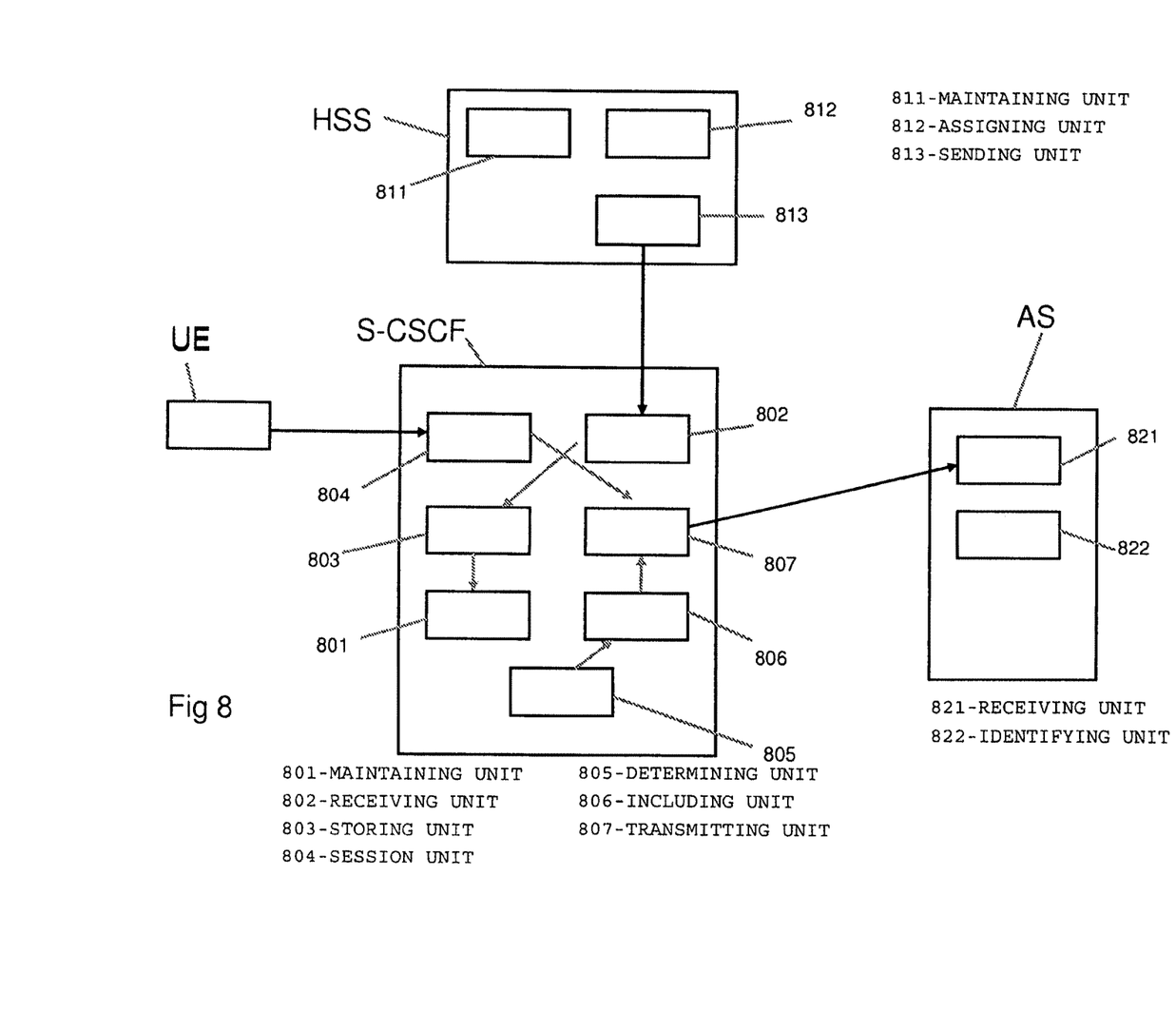
FIG. 8 illustrates internal structure of an HSS, an S-CSCF and an AS according an embodiment of the invention.

A session handling entity, such as S-CSCF, can include a maintaining unit 801 configured to maintain a relationship between at least one public user identity, at least one private user identity and at least one contact address of a user of a communication system. The maintaining unit 801 can be configured to maintain the relationship between the at least one public user identity, the at least one private user identity and the at least one contact address within a subscription of the user. The session handling entity can have a receiving unit 802 configured to receive from a subscription entity (such as HSS) an indication of a correlation identity associated with the user, for example according to Diameter protocol, and a storing unit 803 for storing the indication of the correlation identity as part of the relationship maintained by the maintaining unit 801. The correlation identity can comprise a CS identity (for example E.164, MSISDN) of the user or an IMS identity of the user. The session handling entity can comprise a session unit 804 configured to receive a session request of the user. The request can be received according to SIP. The session request can comprise a request to transfer the session to another access network technology, a handover request and an emergency session request. A determining unit 805 can determine the correlation identity for the user based on a contact address of the user included in the session request and the indication of a correlation identity associated with the user. An including unit 806 can be configured to include the correlation identity in the session request. The session handling entity can have a transmitting unit 807 for transmitting the session request to an application server. The determining unit 805 can be configured to determine the correlation identity by mapping a combination of the contact address and the public identity received in the session request to the private identity of the user in the maintaining unit 801. The indication of the correlation identity associated with the user can comprise the correlation identity being bound to the private identity of the user.

A subscription entity, such as HSS, can comprise a maintaining unit 811 to maintain subscription data of a user, such as IMPI, IMPU etc. The subscription entity can have an assigning unit 812 configured to assign one of the identities in the subscription data as a correlation identity for the user. The correlation identity can comprise a CS identity (for example E.164, MSISDN) of the user or an IMS identity of the user. The subscription entity can comprise a sending unit 813 configured to send an indication of the correlation identity to a session handling entity. The sending unit 813 can be configured to send the indication of the correlation identity as part of a user profile download.

An application server, such as a VCC AS or an ICS AS, can comprise a receiving unit 821 configured to receive a session request from the session handling entity, and an identifying unit 822 configured to identify, based on the correlation identity received in the session request, a session leg to be transferred to another access technology. The session leg can be a CS call or an IMS session.

All units described above may be implemented for example using microprocessors and/or other electrical components and/or by software.

A session handling entity and a subscription entity may be physically implemented in a switch, router, server or other hardware platform or electronic equipment which can support data transmission and processing tasks, or can be implemented as a component of other existing device.

The invention is not limited to the IMS, but can also be applied in other type of networks having similar type of shared identities as in the IMS. Therefore, the IMS, the S-CSCF, the AS and the HSS are only used here as examples communication system and network elements. Functions of the session handling entity and the subscription entity described above may be implemented by code means, as software, and loaded into memory of a computer.

The invention claimed is:

1. A subscription entity in a communication system, said subscription entity comprising:
one or more processors, and
one or more memories including computer program code, the one or more memories and the computer program code configured, with the one or more processors, to cause the subscription entity to perform the following:
maintaining subscription data of a user, the subscription data comprising at least one Circuit Switched identity of the user and at least one IP Multimedia Subsystem (IMS) identity of the user,
assigning one of the identities in the subscription data as a correlation identity for the user for correlating a Circuit Switched call of the user to a session initiation protocol (SIP) session of the user, and
sending an indication of the correlation identity to a session handling entity,
wherein said subscription entity provides said correlation identity to a session handling entity for use by said session handling entity in order to perform a domain transfer of the user from a circuit switched domain to an IMS domain, and
wherein the correlation identity comprises a mobile subscriber international ISDN number (MSISDN) of the user and wherein the correlation identity is bound to a private IMS identity of the user.

2. The subscription entity of claim 1, wherein the one or more memories and the computer program code are configured, with the one or more processors, to cause the subscription entity to:
send the indication of the correlation identity as part of a user profile download.

3. A method for correlating sessions in a communication system, said method comprising:
maintaining subscription data of a user, the subscription data comprising at least one Circuit Switched identity of the user and at least one IP Multimedia Subsystem (IMS) identity of the user,
assigning one of the identities in the subscription data as a correlation identity for the user for correlating a Circuit Switched call of the user to a session initiation protocol (SIP) session of the user, and
correlating the Circuit Switched call of the user to the session initiation protocol (SIP) session of the user based on the correlation identity,
wherein said method is performed by a subscription entity in a communication system to enable said subscription entity to provide said correlation identity to a session handling entity for use by said session handling entity in order to perform a domain transfer of the user from a circuit switched domain to an IMS domain, and
wherein the correlation identity comprises a mobile subscriber international ISDN number (MSISDN) of the user and wherein the correlation identity is bound to a private IMS identity of the user.

4. The method of claim 3, wherein the maintaining and the assigning are performed at a home subscriber server and the correlating is performed at an application server.

5. A computer program product comprising a non-transitory computer-readable storage medium bearing computer program code embodied therein for use with a computer, the computer program code comprising code for performing the method according to claim 3.

6. A session handling entity in a communication system, said session handling entity comprising:
one or more processors, and
one or more memories including computer program code, the one or more memories and the computer program code configured, with the one or more processors, to cause the session handling entity to perform the following:
maintaining a relationship between at least one public user identity, at least one private user identity and at least one contact address of a user of a communication system, wherein the maintained relationship comprises at least one Circuit Switched identity of the user and at least one IP Multimedia Subsystem (IMS) identity of the user,
receiving from a subscription entity an indication of a correlation identity associated with the user,
storing the indication of the correlation identity as part of the relationship being maintained,
receiving a session request of the user,
determining the correlation identity for the user based on the at least one contact address of the user included in the session request and the indication of the correlation identity associated with the user, and
including the correlation identity in the session request to correlate a Circuit Switched call to a session initiation protocol (SIP) session,
wherein said session handling entity obtains said correlation identity from said subscription entity for use by said session handling entity in order to perform a domain transfer of the user from a circuit switched domain to an IMS domain, and
wherein the correlation identity comprises a mobile subscriber international ISDN number (MSISDN) of the user and wherein the correlation identity is bound to a private IMS identity of the user.

7. The session handling entity of claim 6, wherein the one or more memories and the computer program code are configured, with the one or more processors, to cause the session handling entity to:
transmit the session request to an application server.

8. The session handling entity of claim 6, wherein the one or more memories and the computer program code are configured, with the one or more processors, to cause the session handling entity to:
determine the correlation identity by mapping a combination of the at least one contact address and the at least one public identity received in the session request to the at least one private identity of the user.

9. The session handling entity of claim 6, wherein the session request comprises one of a request to transfer the session to another access network technology, a handover request and an emergency session request.

10. The session handling entity of claim 6, wherein the one or more memories and the computer program code are configured, with the one or more processors, to cause the session handling entity to:
maintain the relationship between the at least one public user identity, the at least one private user identity and the at least one contact address within a subscription of the user.

11. A method of correlating sessions in a communication system, said method comprising:
maintaining a relationship between at least one public user identity, at least one private user identity and at least one contact address of a user of a communication system, wherein the maintained relationship comprises at least one Circuit Switched identity of the user and at least one IP Multimedia Subsystem (IMS) identity of the user,
receiving from a subscription entity an indication of a correlation identity associated with the user,
storing the indication of the correlation identity as part of the maintained relationship,
receiving a session request of the user,
determining the correlation identity for the user based on the at least one contact address of the user included in the session request and the indication of the correlation identity associated with the user, and
including the correlation identity in the session request to correlate a Circuit Switched call to a session initiation protocol (SIP) session,
wherein said method is performed by a session handling entity in a communication system to obtain said correlation identity from said subscription entity for use by said session handling entity in order to perform a domain transfer of the user from a circuit switched domain to an IMS domain, and
wherein the correlation identity comprises a mobile subscriber international ISDN number (MSISDN) of the user and wherein the correlation identity is bound to a private IMS identity of the user.

12. The method of claim 11, further comprising identifying a session leg to be transferred to another access technology based on the correlation identity received in the session request.

13. The method of claim 12, wherein the identifying the session leg to be transferred is done at an application server to which the session request is transmitted.

14. A computer program product comprising a non-transitory computer-readable storage medium bearing computer program code embodied therein for use with a computer, the computer program code comprising code for performing the method according to claim 11.

* * * * *